April 10, 1934.    A. L. BRIDGHAM    1,954,752
NOZZLE VALVE
Filed Aug. 1, 1933
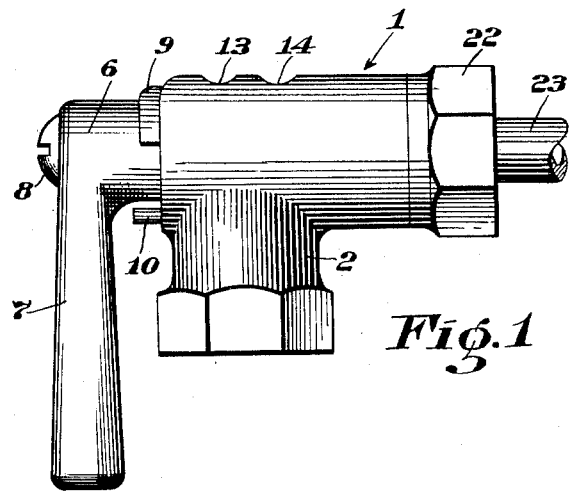
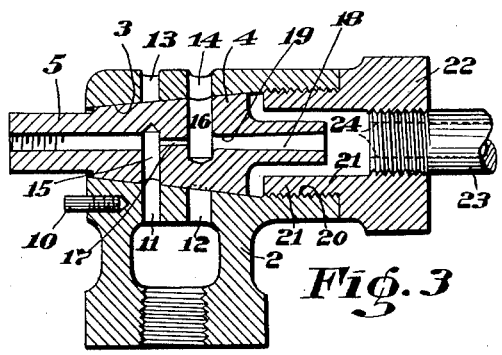
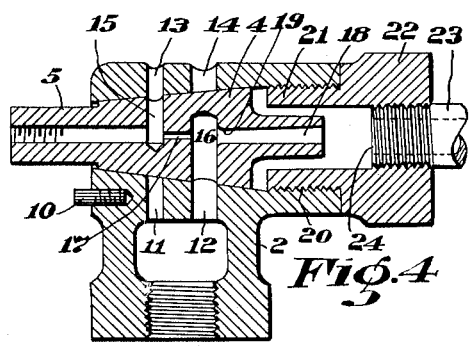
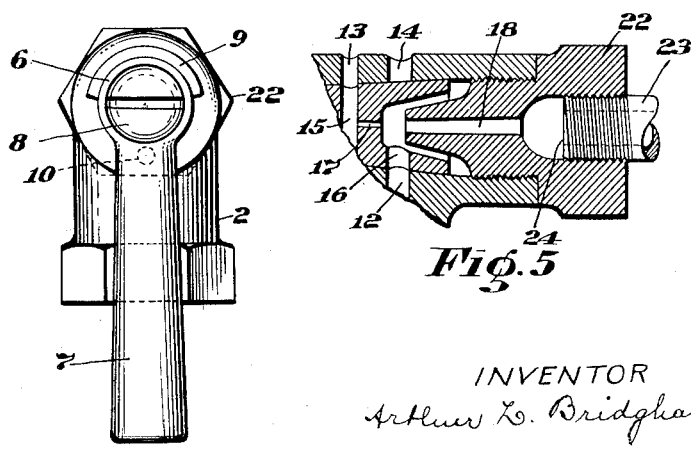
INVENTOR
Arthur L. Bridgham
BY
John E. R. Hayes
ATTORNEY Patented Apr. 10, 1934

1,954,752

UNITED STATES PATENT OFFICE 1,954,752

NOZZLE VALVE

Arthur L. Bridgham, Boston, Mass.

Application August 1, 1933, Serial No. 683,176

8 Claims. (Cl. 230—95)

The invention relates to a nozzle valve for controlling the flow of compressed air, or equivalent gaseous fluid, where the compressed air is being used for doing some objective work, as, for example, for effecting the sanding operation in a locomotive, to which end the valve is especially applicable.

The essential object of the invention is to conserve the compressed air and enable atmospheric air to assist in doing the work.

A further object of the invention is to provide a combination nozzle valve which will enable the operator at will to either use compressed air alone, or compressed air combined with atmospheric air.

A still further object is the accomplishment of various structural features to be later referred to.

The invention can best be seen and understood by reference to the drawing in which—

Fig. 1 is a side elevation of the valve.

Fig. 2 is an end elevation of the valve.

Figs. 3 and 4 are longitudinal cross sections in which the valvular structure is shown in different positions dependent upon the changed positions of the valve, and Fig. 5 shows in cross section a slightly modified structure.

1 represents a casing, the hollow body of which is provided with an angular extension 2 offset from the inner end of the body and internally threaded to receive a pipe connection (not shown) through which air under pressure is directed to the chamber of the extension.

The hollow body of the casing presents an interior surface or bore 3 generally conical in form leading in from the inner end of said body. Located to turn in this bore, forming a seat, is a valve 4 having a stem 5 which extends outwardly beyond the inner end of the casing. Fitting upon this stem to turn therewith, and with the valve, is a hub 6 bearing a handle 7 by which the valve is turned. Threaded to fit within the end of the valve stem is a screw 8 the head of which has bearing against the outer end of the hub. On tightening the screw the hub will be moved to contact with the inner end of the casing and the valve will be drawn to fit snugly within the conical bore of the casing forming a seat for the valve. Borne by the hub 6 is an arcuate edging 9 which, when the hub and valve with it are turned by the handle, is adapted to engage a stop 10 fixed to the inner end of the casing thereby defining and limiting the open positions of the valve as will later be referred to.

The casing 1 has extending through it the ports 11, 12 and 13, 14. Of these the ports 11 and 12 extend from the chamber of the extension 2 of the casing to which the air under pressure is admitted. The ports 11 and 12 are parallelly arranged lying within a plane common with the axis of the valve with extension at right angles to said axis. The ports 13 and 14 open to the atmosphere are parallelly arranged in diametrically opposed relation to the ports 11 and 12 in alignment therewith. They accordingly lie within a plane common with the ports 11, 12 and axis of the valve with extension at right angles to said axis.

The valve has located within it the ports 15 and 16 and connecting passage 17. Each of the ports 15 and 16 extends from the exterior of the valve and bore of the casing to a point well beyond the axis of the valve. They are so arranged that they will coincide with and lie in extension of certain of the ports in the casing, depending upon the turned open positions of the valve. When the valve has been turned to one open position, as defined by the stop 10, its port 15 will lie in coincidence with and in extension of the port 11 in the casing. At this same time the port 16 in the valve will lie in coincidence with and in extension of the port 14 in the casing. The ports 12 and 13 in the casing will then be closed by the valve. On reverse turning of the valve for the distance of a half circle as defined by the stop, the port 12 in the casing will be brought into coincidence with and in extension of the port 16 in the valve, and at the same time the port 15 in the valve will be brought into coincidence with and in extension of the port 13 in the casing. The ports 11 and 14 in the casing will then be closed by the valve. The passage 17 connecting the ports 15 and 16 lies within and extends in the direction of the axis of the valve.

Beyond the passage 17 with extension from the port 16 to the outer end of the valve is a passage 18. This passage, also, lies within the axis of the valve and extends in the direction of said axis. The passage 18 is preferably provided with a contracted neck portion 19, the passage contracting to said neck portion with slight outward divergence therefrom.

That portion of the casing lying forward of the valve has an internally threaded bore 20. Screw threaded to fit therein is a sleeve 21 borne by a nut 22 by which the sleeve is turned to fit within the casing and which nut tightens against the outer end of the casing. Having threaded connection with the nut 22 is the end of a pipe 23 through which the air passes after passing the valve and which leads to the sander or other objective point. The bore 24 of that end portion of the pipe 23 fitting within the nut 22 lies in the discharge direction of the passages 17 and 18 and in alignment with said passages.

The valvular structure thus far described has inherent in it two nozzles afterwards referred to as the primary and secondary nozzles. The primary nozzle resides in that portion of the structure containing the passage 17; the secondary nozzle in that portion of the structure containing the passage 18.

The closed position of the valve is one in which the ends of the edging 9 on the hub of the handle will be substantially equidistant from the stop 10. The open positions of the valve defined by engagement of the ends of the edging 9 with the stop, as previously referred to, are shown respectively in Figs. 3 and 4. The open position of the valve shown in Fig. 3 enables the user to accomplish the objective result with great conservation in the amount of compressed air used as compared with the position of the valve in Fig. 4 when compressed air alone is used to obtain the same result. Referring first to the position of the valve as shown in Fig. 3 the general operation is as follows: The ports 12 and 13 in the casing will be closed and compressed air admitted to the chamber of extension 2 will pass through the then aligned ports 11 and 15 and thence through the passage 17 of the primary nozzle. The air will pass through this nozzle with high velocity owing to the restricted size of its passage 17. Air discharged from this nozzle will pass through the port 16 in the valve and discharge into the passage 18 of the secondary nozzle. Air issuing from the primary nozzle will create a vacuum in the port 16 and inasmuch as this port is then in open communication with the atmosphere, by way of the then aligned port 14 in the casing, atmospheric air will be drawn in and discharge into the passage 18 of the secondary nozzle augmenting to a great extent the amount of compressed air discharged through this nozzle. The air thus discharged into the passage 18 of the secondary nozzle will pass therethrough with high velocity owing to the form of the passage and will discharge into the pipe 23 through which it passes to effect the sanding operation or other operation for which the air is to be used. When the valve is in the open position just described evidence thereof will be shown by the sucking of air into the port 14 which gives a clearly audible signal. This is important for oftentimes the attention of the operator is detracted and it is desirable that there be some audible evidence that the valve is in an open position.

It will now be assumed that the valve has been turned into the position shown in Fig. 4 as defined by the stop 10. The ports 11 and 14 in the casing will be closed and compressed air admitted to the chamber of the extension 2 will then pass by way of the then aligned ports 12 and 16 directly into the passage 18 through which it discharges into the pipe 23. A portion of the compressed air admitted by way of the ports 12 and 16 will pass back through the passage 17 and escape to the atmosphere by way of the then aligned ports 15 and 13. Air thus admitted to the atmosphere will escape with a pronounced hissing sound which warns the operator of this open position of the valve.

The size of the various ports and passages in the nozzle valve especially the size of the openings in the primary and secondary nozzles will depend upon the particular work to be done. In the case of the nozzle valve shown for controlling the passage of air to the sander of a locomotive the following dimensions of ports and passages have been found to produce excellent results. The passage 17 has a bore of $\frac{1}{16}''$. The neck portion 19 of the passage 18 has a bore of $\frac{1}{8}''$. The pipe 23 has a bore of $\frac{1}{4}''$. The ports 11, 13 and 15 each has a bore of $\frac{1}{8}''$. The ports 12, 14 and 16 each has a bore of $\frac{3}{16}''$.

The structure may well be varied without departing from the essential spirit of the invention. For example as shown in Fig. 5 the secondary nozzle is shown not on the valve, but on the sleeve 21 which has been reformed to provide the nozzle passage 18 through it.

The normal open position of the valve is as shown in Fig. 3 where atmospheric air is depended upon in large part to obtain the objective result. The open position of the valve shown in Fig. 4, when compressed air alone is depended upon, is used when a very heavy blast is desired for clearing the connections lying forward of the valve in case they became plugged. This use is generally but a casual one.

As before noted the device is especially applicable for effecting the sanding operation in a locomotive. When used for this purpose with the valve positioned as shown in Fig. 3 the sanding operation is effected with a saving of about sixty per cent in the amount of compressed air used as compared with the amount previously used.

By the term air as used herein and in the claims is meant to include any gaseous fluid for which the nozzle valve may be used.

Having thus fully described my invention, I claim and desire to secure by Letters Patent of the United States:

1. A nozzle valve comprising a casing having an inlet for compressed air with separate ports leading therefrom into the chamber of the casing, said casing having also separate ports extending from the chamber of the casing to the atmosphere and oppositely arranged with relation to said ports for entrance of compressed air, a valve arranged to turn within the chamber of the casing having a passage therein forming a nozzle for the discharge of compressed air admitted to the casing, said valve having also, within it separate ports arranged whereby for one turned position of the valve one of its ports will form communication between one inlet port in the casing for compressed air and the inlet end of said nozzle, and the other of said ports in the valve will then form communication between the discharge end of said nozzle and one of said ports in the casing to the atmosphere, said ports in the valve being arranged, also, whereby for another turned position of the valve said one of its ports will form communication between the inlet end of the nozzle and the other of said ports in the casing to the atmosphere, and said other of the ports in the valve will then form communication between the other of said inlet ports in the casing for compressed air and the discharge end of said nozzle.

2. A nozzle valve comprising a casing having an inlet for compressed air with separate ports leading therefrom into the chamber of the casing, said casing having also separate ports extending from the chamber of the casing to the atmosphere and oppositely arranged with relation to said ports for entrance of compressed air, a valve arranged to turn within the chamber of the casing having a passage therein forming a primary nozzle for the discharge of compressed air admitted to the casing, a secondary nozzle arranged forward of said primary nozzle in axial alignment therewith and spaced therefrom, said valve having, also, within it separate ports arranged whereby for one turned position of the valve one of its ports will form communication between one inlet port in the casing for compressed air and the inlet end of said nozzle and the other of said ports in the valve will then form communication between the space separating said nozzles and one of said ports in the casing to the atmosphere, said ports in the valve being arranged also whereby for another turned position of the valve said one of its ports will form communication between the inlet end of the nozzle and the other of said ports in the casing to the atmosphere, and said other of the ports in the valve will then form communication between the other of said inlet ports in the casing for compressed air and the space between said nozzles.

3. A nozzle valve comprising a casing having ports for introducing compressed air and air from the atmosphere into the casing, a valve arranged to turn in the casing and provided with a primary nozzle extending axially of the valve and ports leading from the casing to the opposite ends of said nozzle, a secondary nozzle arranged forward of said primary nozzle in alignment therewith and in spaced relation thereto, and means for turning the valve to one position to supply the secondary nozzle with compressed air amplified by air from the atmosphere and to a second position to supply it with compressed air alone.

4. A nozzle valve comprising a casing having ports for introducing compressed air and air from the atmosphere into the casing, a valve arranged to turn in the casing and provided with a primary nozzle extending axially of the valve and ports leading from the casing to the opposite ends of said nozzle, a secondary nozzle arranged forward of said primary nozzle in alignment therewith and in spaced relation thereto, and means for turning the valve to one position to supply air under pressure to the primary nozzle to be directed by it with a suction action through the secondary nozzle and to a second position to introduce air under pressure into the space between the primary and secondary nozzles to force this air through the secondary nozzle.

5. A nozzle valve comprising a casing having ports for introducing compressed air and air from the atmosphere into the casing, a valve arranged to turn in the casing and provided with a primary nozzle extending axially of the valve and ports leading from the casing to the opposite ends of said nozzle, a secondary nozzle arranged forward of said primary nozzle in alignment therewith and in spaced relation thereto, and means for turning the valve to one position to supply air under pressure to the primary nozzle to be directed by it with a suction action through the secondary nozzle and to a second position to introduce air under pressure into the space between the primary and secondary nozzles to force part of this compressed air through the secondary nozzle and part in the reverse direction through the primary nozzle to cause it to escape from the latter with an audible sound.

6. A nozzle valve comprisng a casing having ports for introducing compressed air and air from the atmosphere into the casing, a valve arranged to turn in the casing and provided with a primary nozzle extending axially of the valve and ports leading from the casing to different portions of said nozzle, a secondary nozzle arranged forward of said primary nozzle in alignment therewith and in spaced relation thereto, and means for turning the valve to one position to introduce compressed air through the primary and secondary nozzles in one direction and for turning the valve to a second position for introducing part of the compressed air through the primary nozzle in the opposite direction and part through the secondary nozzle.

7. A nozzle valve comprising a casing having ports for inlet of compressed air and atmospheric air, respectively, a valve arranged to turn within the casing having in it a primary nozzle, a secondary nozzle arranged forward of the outlet end of said primary nozzle and into which said primary nozzle discharges, said valve having separate ports, one leading from the inlet end of said primary nozzle and communicating with an inlet port in the casing for compressed air when the valve is in a determinate turned position, and the other port in the valve leading from the discharge end of said primary nozzle and space between said nozzles and communicating with an inlet port in the casing for atmospheric air when said valve is in its said determinate turned position and communicating with an inlet port in the casing for compressed air when said valve is turned away from its said determinate position.

8. A nozzle valve comprising a casing having ports for inlet of compressed air and atmospheric air, respectively, a valve arranged to turn within the casing having in it a primary nozzle, a secondary nozzle arranged forward of the discharge end of said primary nozzle and into which said primary nozzle discharges, said valve having separate ports, one leading from the inlet end of said primary nozzle and communicating with an inlet port in the casing for compressed air when the valve is in one determinate turned position and communicating with a port leading to the atmosphere when said valve is in another determinate turned position, and the other port in said valve leading from the discharge end of said primary nozzle and space between said nozzles and communicating with an inlet port in the casing for atmospheric air when said valve is in said one determinate turned position, and communicating with an inlet port in the casing for compressed air when said valve is in said other determinate turned position.

ARTHUR L. BRIDGHAM.